(12) United States Patent
Morisaki

(10) Patent No.: US 8,839,825 B2
(45) Date of Patent: Sep. 23, 2014

(54) BEAD WIRE WINDING AND FORMING DEVICE

(75) Inventor: Toshiaki Morisaki, Hashima (JP)

(73) Assignee: Fuji Seiko Co., Ltd., Hashima-shi (JP)

( * ) Notice: Subject to any disclaimer, the term of this patent is extended or adjusted under 35 U.S.C. 154(b) by 884 days.

(21) Appl. No.: 12/937,303

(22) PCT Filed: Feb. 16, 2009

(86) PCT No.: PCT/JP2009/052488
§ 371 (c)(1),
(2), (4) Date: Oct. 11, 2010

(87) PCT Pub. No.: WO2009/128286
PCT Pub. Date: Oct. 22, 2009

(65) Prior Publication Data
US 2011/0030835 A1    Feb. 10, 2011

(30) Foreign Application Priority Data

Apr. 14, 2008  (JP) .................................. 2008-104563

(51) Int. Cl.
| | | |
|---|---|---|
| *B29D 30/48* | (2006.01) | |
| *B65H 81/00* | (2006.01) | |
| *B21F 37/00* | (2006.01) | |
| *B65H 57/28* | (2006.01) | |
| *B21F 11/00* | (2006.01) | |
| *B21F 99/00* | (2009.01) | |
| *E05B 63/12* | (2006.01) | |
| *E05B 65/28* | (2006.01) | |

(52) U.S. Cl.
CPC .............. *B29D 30/48* (2013.01); *B65H 81/00* (2013.01); *B29D 2030/487* (2013.01); *B21F 37/00* (2013.01); *B65H 57/28* (2013.01)
USPC .............................. 140/88; 140/123.6; 72/142

(58) Field of Classification Search
CPC ............ B21B 19/04; B21D 3/04; B21D 5/08; B21D 53/00; B21D 11/06; B21D 3/12; B21D 22/02; B21F 3/04; B21F 35/02; B21F 3/06; B21F 3/02; B29B 30/48; B29D 2030/487; B65B 13/027; B65B 13/025
USPC ........... 72/428, 129–132, 135, 142, 144, 378; 140/88, 123.6, 428
See application file for complete search history.

(56) References Cited

U.S. PATENT DOCUMENTS

| | | | | | |
|---|---|---|---|---|---|
| 2,395,020 | A | * | 2/1946 | Sternad | 156/395 |
| 3,057,566 | A | * | 10/1962 | Braden | 140/88 |
| 3,080,127 | A | * | 3/1963 | Porter | 140/88 |
| 3,330,491 | A | * | 7/1967 | Williams | 140/88 |
| 4,202,717 | A | | 5/1980 | Seiberling | |

(Continued)

FOREIGN PATENT DOCUMENTS

| | | |
|---|---|---|
| CN | 1646300 A | 7/2005 |
| CN | 1647958 A | 8/2005 |

(Continued)

OTHER PUBLICATIONS

International Search Report issued May 26, 2009 in PCT/JP09/052488 filed Feb. 16, 2009.

(Continued)

*Primary Examiner* — Shelley Self
*Assistant Examiner* — Lawrence Averick
(74) *Attorney, Agent, or Firm* — Oblon, Spivak, McClelland, Maier & Neustadt, L.L.P.

(57) ABSTRACT

In a bead wire winding and forming device, a guide mechanism guiding a bead wire to a former is supported to be movable in a tangential direction of the former and includes a movable body capable of clamping and unclamping the bead wire, a guide body supported on the movable body to be swingable in a plane parallel to a rotational axis of the former and having a guide portion for guiding the bead wire in the tangential direction of the former, and a restriction member for allowing the swing motion of the guide body when the movable body is at a retracted position but for restricting the swing motion of the guide body when the movable body is at an advanced position.

9 Claims, 5 Drawing Sheets

(56) References Cited

U.S. PATENT DOCUMENTS

| | | | | |
|---|---|---|---|---|
| 4,597,157 | A | * | 7/1986 | Ichikawa .................... 29/564.8 |
| 4,759,813 | A | * | 7/1988 | Banas et al. ................. 156/136 |
| 4,806,196 | A | * | 2/1989 | Smith et al. .................. 156/422 |
| 5,141,032 | A | * | 8/1992 | Rausch .......................... 140/88 |
| 5,385,621 | A | * | 1/1995 | Golightly ..................... 156/136 |
| 6,352,602 | B1 | * | 3/2002 | Ogawa .......................... 156/131 |
| 2005/0161141 | A1 | | 7/2005 | Nakagawa |
| 2005/0161162 | A1 | | 7/2005 | Bakos et al. |
| 2005/0252594 | A1 | | 11/2005 | Suzuki |
| 2006/0207677 | A1 | * | 9/2006 | Carr .............................. 140/88 |

FOREIGN PATENT DOCUMENTS

| | | |
|---|---|---|
| CN | 1695936 A | 11/2005 |
| FR | 1 361 289 | 5/1964 |
| JP | 56-105948 | 8/1981 |
| JP | 6 286021 | 10/1994 |
| JP | 6 286022 | 10/1994 |
| JP | 2002 337250 | 11/2002 |
| JP | 2009 12326 | 1/2009 |

OTHER PUBLICATIONS

Combined Chinese Office Action and Search Report issued Oct. 10, 2012, in Patent Application No. 200980112323.7 (with English-language translation).

Extended European Search Report issued on Aug. 18, 2011 in the corresponding European Application No.: 09733531.9.

* cited by examiner

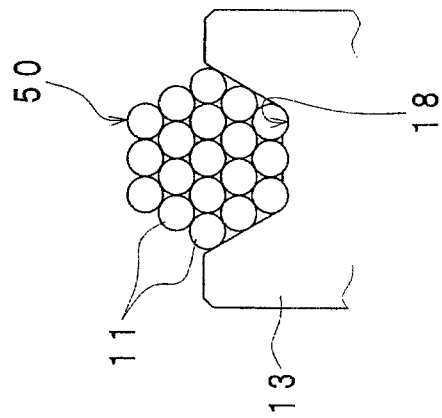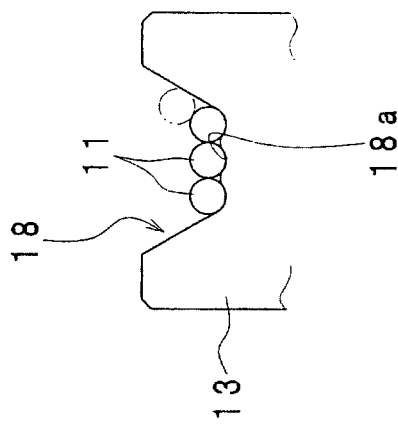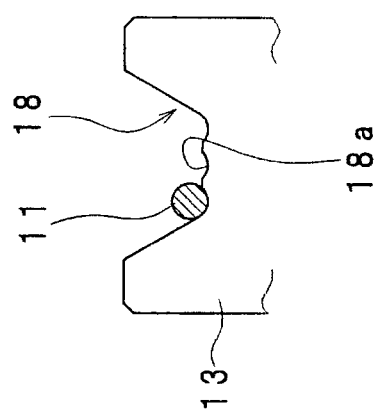

BEAD WIRE WINDING AND FORMING DEVICE

TECHNOLOGICAL FIELD

The present invention relates to a bead wire winding and forming device for winding and forming a bead wire around a former to manufacture an annular bead core.

BACKGROUND ART

In pneumatic tires, in order to maintain the tire rigidity, annular bead cores in each of which a bead wire is wound in multiple layers are equipped in turn-up portions of a carcass. Generally, a bead core is manufactured by winding and forming a rubber-coated bead wire around a drum-like former. As a bead wire winding and forming device of this kind, there has been know one which is described in, for example, Patent Document 1.

In the bead wire winding and forming device described in Patent Document 1, a belt-shaped tape bead (B) in which a plurality of bead wires arranged in parallel are embedded in rubber is wound on the outer circumferential surface of a drum (3) through plural numbers of turns to form a bead core.
Patent Document 1: JP2002-337250

DISCLOSURE OF THE INVENTION

Measures for Solving the Problem

In the bead wire winding and forming device described in Patent Document 1, because of the construction that the belt-shaped tape bead is wound around the outer circumferential surface of the drum, the device is unable to manufacture nothing but bead cores of the shape being a rectangular in cross-section, and therefore, a problem arises in that the device is short of versatility.

On the other hand, by winding a single line of a continued bead wire around the outer circumference of a former in plural rows along the rotational axis of the former and by building up the plural rows in the radial direction of the former, the bead core can easily be manufactured to about hexagon, round or the like in cross-section in dependence on the kind of pneumatic tires to be produced.

However, in the winding and forming device for winding a single line of a continued bead wire around the outer circumference of a former, the bead wire is to be moved in the direction of the rotational direction of the former in dependence on the winding position on the former, and therefore, a problem arises in that it is difficult to accurately wind the bead wire around the former.

The present invention has been made in order to solve the aforementioned problems in the prior art, and an object thereof is to provide a bead wire winding and forming device capable of accurately winding a bead wire around a former by enabling a guide body which guides the bead wire, to swing in a horizontal direction and by restricting the swing motion.

Measures for Solving the Problem

In order to solve the foregoing problems, the feature of the invention in a first aspect resides in that in a bead wire winding and forming device having a rotatable former for winding a rubber-coated bead wire therearound to form an annular bead core, guide means for guiding the bead wire to the former, and cutting means for cutting a rear end portion of the bead wire which is wound around the former a predetermined amount, the guide means comprise a movable body supported to be movable in a tangential direction of the former and being capable of clamping and unclamping the bead wire, a guide body supported on the movable body to be swingable in a plane parallel to a rotational axis of the former and having a guide portion for guiding the bead wire in the tangential direction of the former, and a restriction member for allowing the swing motion of the guide body when the movable body is at a retracted position, but for restricting the swing motion of the guide body when the movable body is at an advanced position.

The feature of the invention in a second aspect resides in that in the first aspect, the restriction member is provided on a support frame which movably supports the movable body, and has a restriction hole inserting the guide body therein and that the guide body is formed at a forward end portion thereof with a taper portion loosely inserted in the restriction hole and at a rearward end portion thereof with a constant width portion engaged with the restriction hole.

The feature of the invention in a third aspect resides in that in the first or second aspect, the former has a recessed channel for winding the bead wire around an outer circumference thereof and that the recessed channel is formed thereon with grooves of plural rows for guiding the bead wire.

The feature of the invention in the fourth aspect resides in that in any one of the first to third aspects, the guide portion of the guide body is configured to restrict the bead wire from moving in a swing direction of the guide body but to allow the bead wire to move in a direction perpendicular to the swing direction of the guide body.

Effects of the Invention

In the invention in the first aspect, the guide means for guiding the bead wire to the former is provided with the guide body swingably supported on the movable body which is movable in the tangential direction of the former, and the restriction member for allowing the swing motion of the guide body when the movable body is at the retracted position, but for restricting the swing motion of the guide body when the movable body is at the advanced position. Thus, it is possible by restricting the swing motion of the guide body to accurately guide a starting end portion of the bead wire to a predetermined portion on the former, and during the winding of the bead wire, it is possible to enable the guide body to swing freely in dependence on the winding position of the bead wire, so that the winding and forming of the bead wire can be carried out reliably and accurately.

In addition, because the bead wire of a single line is wound and formed around the former, the shape of a bead core which is manufactured by the winding and forming of the bead wire can be changed as desired only by replacing an outer circumferential portion of the former. Therefore, it is possible to realize a bead wire winding and forming device which can manufacture bead cores meeting pneumatic tires of various kinds.

In the invention in the second aspect, the restriction member is provided on the support frame which movably supports the movable body, and has the restriction hole inserting the guide body therein, and the guide body is formed at the forward end portion thereof with the taper portion loosely inserted in the restriction hole and at the rearward end portion thereof with the constant width portion engaged with the restriction hole. Therefore, it can be done easily to allow or restrict the swing motion of the guide body by utilizing the advance and retraction movements of the movable body.

In the invention in the third aspect, since the former has the recessed channel for winding the bead wire around the outer circumference thereof and since the recessed channel is formed with the grooves of plural rows for guiding the bead wire, it is possible to make respective turns of the bead wire juxtaposed accurately in the direction of the rotational axis of the former.

In the invention in the fourth aspect, the guide portion of the guide body is configured to restrict the bead wire from moving in the swing direction of the guide body, but to allow the bead wire to move in the direction perpendicular to the swing direction of the guide body. Therefore, where the respective turns of the bead wire are to be piled up in the recessed channel of the former, it is possible for the bead wire to freely move in the pile-up direction.

BRIEF DESCRIPTION OF THE DRAWINGS

[FIGS. 5(A)-5(c)] are explanatory views for showing the processes in winding a bead wire.

DESCRIPTION OF SYMBOLS

10 . . . bead wire winding and forming device, 11 . . . bead wire, 12 . . . tendency application rollers, 13 . . . former, 14 . . . cutting means, 15 . . . guide means, 17 . . . support frame, 18 . . . recessed channel, 18a . . . grooves (annular grooves), 19 . . . guide roller, 20 . . . movable body, 25 . . . guide body, 25a . . . constant width portion, 25b . . . taper portion, 27 . . . guide portion, 29 . . . restriction member, 29a . . . restriction hole, 35 . . . clamper, 41 . . . cutting blade, 50 . . . bead core.

Preferred Embodiment for Practicing the Invention

Figure 1:
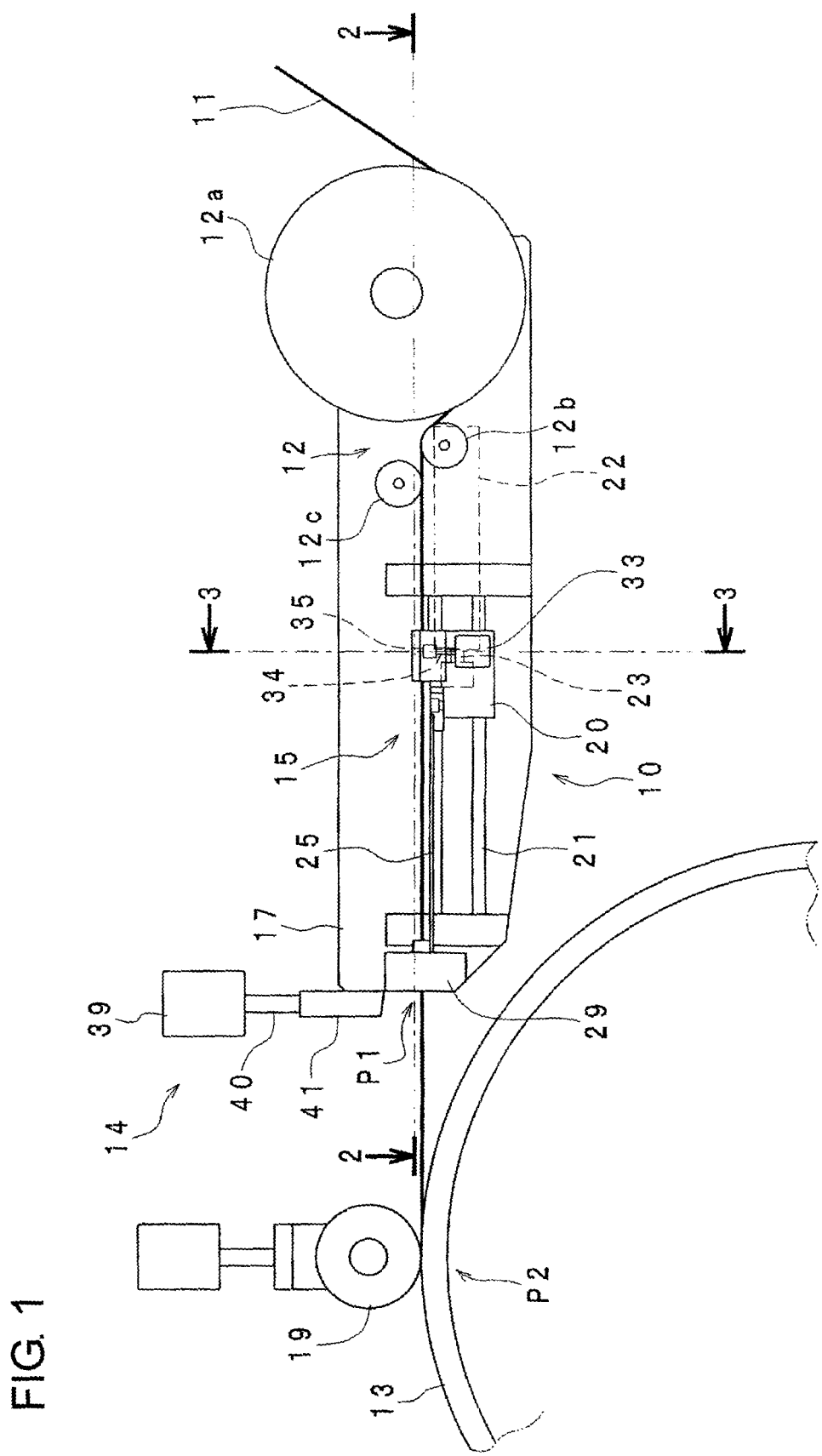
[FIG. 1] is an overall view showing the whole of a bead wire winding and forming device representing an embodiment of the present invention.

Hereafter, an embodiment of the present invention will be described with reference to the drawings. FIG. 1 is a side view schematically showing a bead wire winding and forming device. In FIG. 1, the bead wire winding and forming device 10 is provided with tendency application rollers 12 for applying a tendency toward an arc shape to a bead wire 11 of a circular cross-section on which rubber is coated by a rubber extruding machine (not shown), a rotatable former 13 for winding the bead wire 11 with the tendency applied by the tendency application rollers 12, therearound through a plurality of turns to form a bead core, cutting means 14 for cutting the bead wire 11 at a cutting position P1 each time a bead core is formed, and guide means 15 for clamping the cut bead wire 11 and for guiding a starting end portion of the bead wire 11 from the cutting position P1 to a fixing position P2 where the former 13 can fix it.

The tendency application rollers 12 are composed of a plurality of rollers 12a, 12b, 12c which are rotatably supported on a support frame 17 mounted on a base (not shown), and by being gone through between the plurality of rollers 12a, 12b, 12c, the bead wire 11 is given a tendency toward an arc which approximately conforms in curvature with the outer diameter of the former 13, and thus, can be accurately wound around the outer circumference of the former 13 in the state of true circles.

The former 13 is rotatably supported by the base and can be rotated by an electric motor (not shown). As shown in FIG. 5(A), a recessed channel 18 with opposite side walls inclined in a V-shape is formed on the outer circumference of the former 13, and a plurality of annular grooves 18a each being about a semicircular in cross-section for guiding the bead wire 11 during winding are juxtaposed on a bottom surface of the recessed channel 18 along the bottom surface. The former 13 is constituted by a plurality of sector segments which are arranged in the circumferential direction to be movable radially, and thus, is able to expand and contract in diameter. This makes it possible to remove the bead wire 11 which has be wound through plural numbers of turns in the recessed channel 18 of the former 13, from the recessed channel 18 of the former 13.

Over the former 13, a guide roller 19 is supported on the base to face the recessed channel 18 of the former 13 and to be movable in a radial direction as well as in the direction of the rotational axis of the former 13. The guide roller 19 is formed at an outer circumference thereof with an annular groove which is semicircular in cross-section to engage with the bead wire 11, so that the guide roller 19 is able to guide the bead wire 11 to winding positions.

The guide means 15 is arranged between the tendency application rollers 12 and the former 13 and is provided with a movable body 20 which is movable in a tangential direction of the former 13. The movable body 20 is supported on a pair of guide bars 21 which are provided on the support frame 17 to extend in the tangential direction of the former 13. The movable body 20 is connected to a piston rod 23 of an advance/retraction cylinder 22 mounted on the support frame 17 and is moved by the advance/retraction cylinder 22 to advance or retract by a predetermined stroke in the tangential direction of the former 13. A guide body 25 for guiding the bead wire 11 is supported on the movable body 20 to be swingable about a pivot point which is at one end portion (base end portion) thereof in the longitudinal direction.

Specifically, the guide body 25 is constituted by a flat plate member extending in the moving direction of the movable body 20 and is supported at a base end portion, which is on the tendency application rollers 12 side, to be swingable about a pivot 26 (refer to FIG. 2) in a plane parallel with the rotational axis of the former 13. The other end (forward end portion) on the former 13 side of the guide body 25 is provided with a guide portion 27 for guiding the bead wire 11. The guide portion 27 is such that the guide width in the swing direction of the guide body 25 is set to approximately the same dimension as the wire diameter of the bead wire 11 while the guide width in the direction perpendicular thereto (in the radial direction of the former 13) is set to be considerably larger than the wire diameter of the bead wire 11. Therefore, it can be realized to restrict the movement of the bead wire 11 in the swing direction of the guide body 25, but to let the bead wire 11 move freely in the direction perpendicular thereto.

Figure 2:
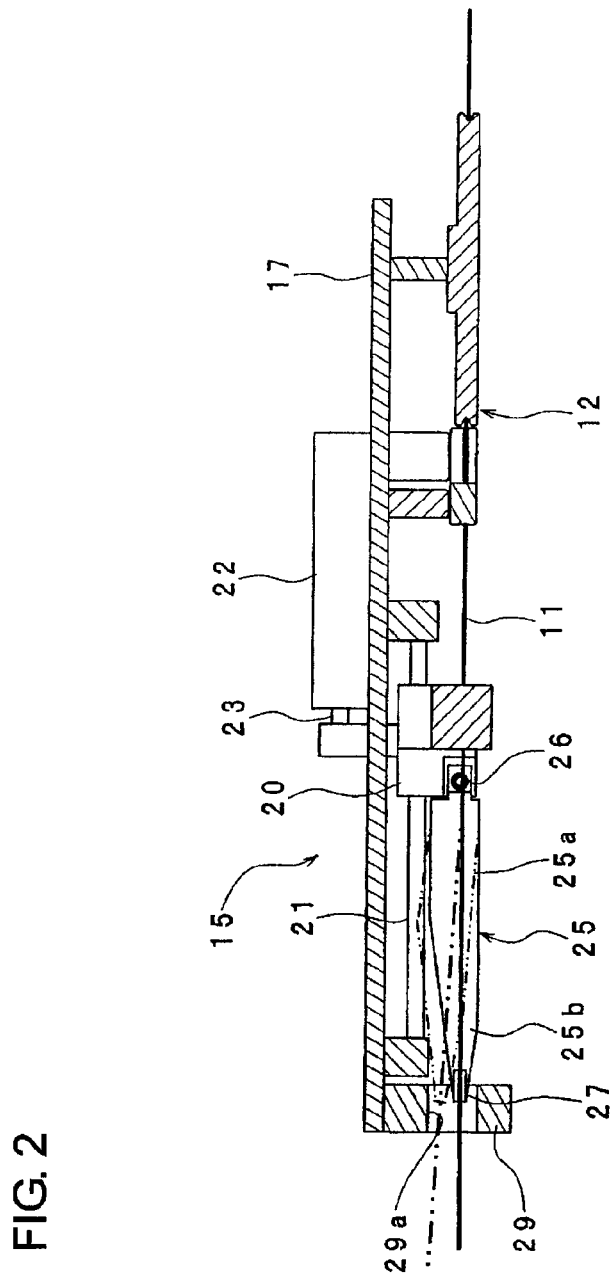
[FIG. 2] is a sectional view taken along the line 2-2 in FIG. 1.

As shown in FIG. 2, the guide body 25 is formed at its base end portion with a constant width portion 25a having a constant width in the swing direction and at its forward end portion with a taper portion 25b which becomes narrower as it goes from the constant width portion 25a toward the forward end. The support frame 17 is provided at its forward end portion with a restriction member 29 which is formed with a restriction hole 29a for inserting the guide body 25 therein. When the movable body 20 is at a retracted end position, the taper portion 25b at the forward end of the guide body 25 remains inserted in the restriction hole 29a, while when the movable body 20 is at an advanced end position, the constant width portion 25a at the rear end of the guide body 25 remains inserted in the restriction hole 29a. When the movable body 20 is at the retracted end position, as shown in FIG. 2, the forward end of the guide body 25 is positioned in the restriction hole 29a without protruding forward from the restriction member 29.

The width of the restriction hole 29a in the swing direction of the guide body 25 is set to approximately the same dimension as the width dimension of the constant width portion 25a of the guide body 25. Thus, when the movable body 20 is at the retracted end position, the taper portion 25b is loosely inserted in the restriction hole 29a to allow the guide body 25 to swing about the pivot 26, while when the movable body 20 is at the advanced end position, the constant width portion 25a is engaged with the restriction hole 29a to restrict the swing motion of the guide body 25, so that the bead wire 11 guided by the guide portion 27 of the guide body 25 is restricted from moving in the lateral direction.

Figure 3:
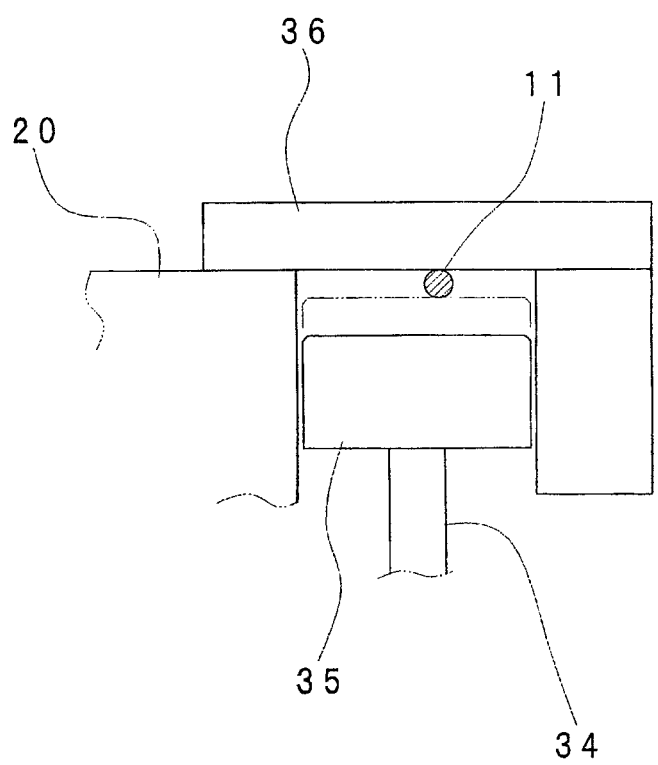
[FIG. 3] is a sectional view taken along the line 3-3 in FIG. 1.

The movable body 20 is provided thereon with a clamper 35 for clamping or unclamping the bead wire 11 on the movable body 20. The damper 35 is connected to a piston rod 34 of a clamping cylinder 33 mounted on the movable body 20. As shown in FIG. 3, a guide block 36 is bodily attached to the movable body 20 at a position which faces the damper 35 with the bead wire 11 placed therebetween. An end portion of the damper 35 is formed to a flat surface parallel to an inner surface (clamping surface) of the guide block 36. Between the clamper 35 and the guide block 36, there is formed a laterally elongated space portion which allows the movement in the lateral direction of the bead wire 11, that is, the movement in the swing direction of the guide body 25 during the aforementioned swing motion of the guide body 25.

Thus, when the damper 35 is operated by the clamping cylinder 33 in a clamping direction, as indicated by the two-dot-chain line in FIG. 3, the bead wire 11 is pressed by the damper 35 against the inner surface of the guide block 36 on the movable body 20, so that the bead wire 11 becomes movable together with the movable body 20. Further, when the clamping of the bead wire 11 by the clamper 35 is released, the bead wire 11 is able to move freely relative to the movable body 20 and becomes movable between the clamper 35 and the guide block 36 in the horizontal direction.

The cutting means 14 is provided with a cutting blade 41 for cutting the bead wire 11, and the cutting blade 41 is connected to a piston rod 40 of a cutting cylinder 39 mounted on the support frame 17. By the operation of the cutting blade 41 by the cutting cylinder 39, it is possible to cut the bead wire 11 at the cutting position P1 where the bead wire 11 projects forward from the restriction member 29.

Next, description will be made regarding the operation of the bead wire winding and forming device 10 as constructed above. The bead wire 11 which has been rubber-coated by the rubber extruding machine (not shown) is given the tendency toward an arc shape by the tendency application rollers 12 and then, runs along the inner surface of the guide block 36 to pass through the guide portion 27 provided at the forward end portion of the guide body 25. As mentioned later, the bead wire 11 is wound around the recessed channel 18 of the former 13 upon rotation of the same, whereby a bead core of a predetermined shape is formed. Upon completion of forming the bead core of the predetermined shape, the bead wire 11 is cut by the cutting blade 41 of the cutting means 14 at the cutting position P1 where it projects forward from the restriction member 29.

Figure 4:
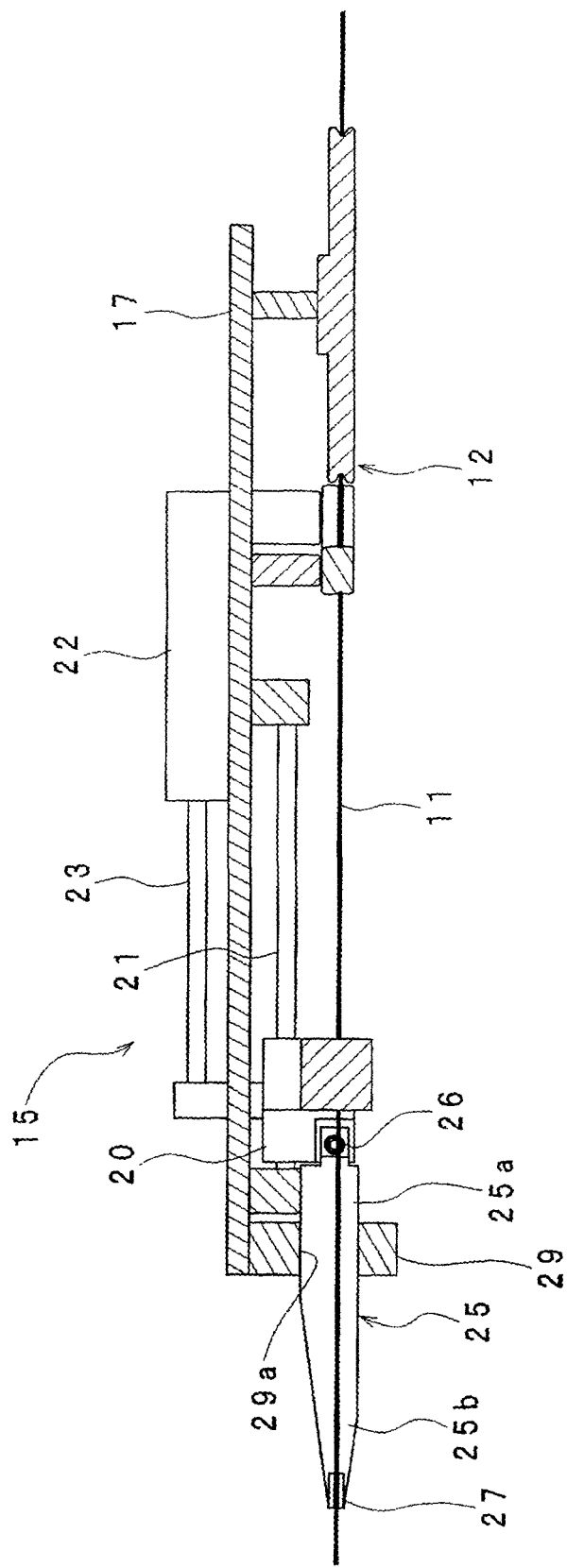
[FIG. 4] is a view showing an operational state in FIG. 2.

When the bead wire 11 is to be wound around the former 13, the bead wire 11 is pressed by the clamping operation of the clamper 35 by the clamping cylinder 33 against the inner surface of the guide block 36 on the movable body 20 to clamp the bead wire 11 on the movable body 20. In this state, the movable body 20 is advanced a predetermined stroke by the advance/retraction cylinder 22. Thus, the bead wire 11 clamped by the clamper 35 is advanced together with the movable body 20, whereby a starting end portion of the bead wire 11 after having been cut is fed onto the annular groove 18a at an end (in a first row) on the bottom surface of the recessed channel 18 of the former 13. As soon as the movable body 20 is advanced to the advanced end position, the starting end portion of the bead wire 11 is clamped by clamping means (not show) on the annular groove 18a in the first row of the recessed channel 18 on the former 13. At this time, as shown in FIG. 4, through the advance movement of the movable body 20, the constant width portion 25a of the guide body 25 supported on the movable body 2.0 is inserted into the restriction hole 29a of the restriction member 29 to restrict the swing motion of the guide body 25. As a consequence, the starting end portion of the bead wire 11 guided by the guide portion 27 of the guide body 25 is accurately fed onto the annular groove 18a in the first row of the recessed channel 18 on the former 13.

As soon as the starting end portion of the bead wire 11 is clamped on the former 13, the clamping cylinder 33 is operated in an unclamping direction to release the clamping by the clamper 35. Subsequently, the movable body 20 is retracted by the advance/retraction cylinder 22 to the retracted end position. With the retraction movement of the movable body 20, the constant width portion 25a of the guide body 25 supported by the movable body 20 is left from the restriction hole 29a of the restriction member 29. Since the taper portion 25b of the guide body 25 comes in the restriction hole 29a, the swing motion of the guide body 25 becomes allowed.

When the movable body 20 is retracted to the retracted end position, the former 13 is rotated by the electric motor (not shown), whereby the bead wire 11 with the starting end portion thereof clamped on the former 13 is wound around the annular groove 18a in the first row on the recessed channel 18 of the former 13 (refer to FIG. 5(A)). At this time, since the bead wire 11 has been given the tendency toward the arc shape by the tendency application rollers 12, the bead wire 11 can be wound around the annular groove 18a on the former 13 accurately in the state of a true circle.

After the bead wire 11 is wound around the annular groove 18a in the first row on the former 13 through one turn, the guide roller 19 is shifted by a distance corresponding to one pitch of the annular grooves 18a in the direction of the rotational axis of the former 13 to move the bead wire 11 onto the next annular groove 18a, so that the rotation of the former 13 causes the bead wire 11 to be wound around the annular groove 18a in the second row. At this time, because the swing motion of the guide body 25 has been allowed, the guide body 25 can swing freely to follow the shift operation of the bead wire 11, so that the winding of the bead wire 11 around the annular groove 18a on the former 13 can be carried out accurately without difficulty.

In this way, the bead wire 11 is shifted by one pitch each time it is wound around each recessed channel 18 on the former 13 through one turn, whereby, as shown in FIG. 5(B), the windings in a first layer are completed with the bead wire 11 wound around all of the annular grooves 18a formed on the bottom surface of the recessed channel 18. When the windings of the bead wire 11 in the first layer are completed, the guide roller 19 is moved to follow one of the V-shape inclined surfaces of the former 13, and thus, the bead wire 11 is wound around the outer circumference of the bead wire 11 in the first layer, as indicated by the two-dot-chain line in the same figure, so that the winding of the bead wire 11 in a second layer is started.

Subsequently, in the windings in the second layer, each time the bead wire 11 is wound through one turn on the recessed channel 18 of the former 13, it is shifted by one pitch in a direction opposite to the aforementioned direction to be wound between every two adjoining rows thereof in the first layer. In this manner, finally, the windings are carried out to form a predetermined section shape (e.g., hexagon), as shown in FIG. 5(C). During these windings, since the guide portion 27 of the guide body 25 is not restraining the movement of the bead wire 11 in the radial direction of the former 13, any unnatural force does not act on the bead wire 11, so that it is possible to build up the bead wire 11 accurately.

As described hereinabove, when a bead core 50 is manufactured as a result that the bead wire 11 is would around the former 13 through a predetermined number of turns, the bead wire 11 is clamped by the clamping cylinder 33 on the movable body 20, in which state, the bead wire 11 is cut by the cutting blade 41 of the cutting means 14 at the cutting position P1 where it projects forward from the restriction member 29. Thereafter, the former 13 composed of the sector segments is contracted in diameter, and the bead core 50 is taken out from the former 13. It is to be noted that since the bead wire 11 is coated with rubber, it does not occur that the windings bring adjoining turns of the bead wire 11 into joining each other so that the bead core 50 loses its shape as soon as it is taken out from the former 13.

Subsequently, the former 13 is expanded in diameter, and in the same manner as described above, the movable body 20 is advanced the predetermined stroke by the advance/retraction cylinder 22, and a starting end portion of the bead wire 11 clamped by the clamper 35 is fed onto the annular groove 18a in the first row on the recessed channel 18 of the former 13 to be clamped thereon. After this, the same operations are repeated to manufacture another bead core 50.

Where a bead core is to be manufactured which is different in the section shape and the number of winding turns for use in pneumatic tires of a different kind, the recessed channel 18 of the former 13 may be changed to that meeting the bead core to be manufactured. To this end, the sector segments composing the former 13 may be configured so that outer circumferential portions thereof forming the recessed channel 18 are replaceable.

As described hereinabove, according to the present embodiment, the guide means 15 for guiding the bead wire 11 to the former 13 is provided with the guide body 25 which is swingably supported on the movable body 20 movable in the tangential direction of the former 13, and the restriction member 29 which allows the swing motion of the guide body 25 when the movable body 20 is at the retracted position, but restricts the swing motion of the guide body 25 when the movable body 20 is at the advanced position. Therefore, it is possible by restricting the swing motion of the guide body 25 to accurately guide the starting end portion of the bead wire 11 to a predetermined position on the former 13. In addition, during the windings of the bead wire 11, it is possible to allow the guide body 25 to swing freely in dependence on the winding position of the bead wire 11, so that it is possible to perform the winding and forming of the bead wire 11 reliably and accurately.

Further, since the bead wire 11 of a single line is would and formed around the former 13, the shape of the bead core 50 manufactured by the winding and forming of the bead wire 11 can be changed as desired only by replacing the outer circumferential portions of the former 13, so that it becomes possible to manufacture bead cores which meet pneumatic tires of various kinds.

In the foregoing embodiment, the annular grooves 18a of plural rows for guiding the bead wire 11 are formed on the bottom surface of the recessed channel 18 provided on the outer circumference of the former 13. However, the grooves formed on the bottom surface of the recessed channel 18 may be replaced by a spiral groove of plural turns, and it is necessarily not an essential requirement to form the annular grooves 18 or the spiral groove on the recessed channel 18.

While having been explained by taking an example of the embodiment as described above, the present invention is not limited to the construction described in the embodiment and may take various forms without departing from the scope of claims.

INDUSTRIAL APPLICABILITY

The bead wire winding and forming device according to the present invention is suitable for application to pneumatic tires with bead cores formed by winding and forming a bead wire to keep the tire rigidity.

The invention claimed is:

1. A bead wire winding and forming device comprising:
a rotatable former to wind a rubber-coated bead wire therearound to form an annular bead core;
a guide device to guide the bead wire to the former; and
a cutting device to cut a rear end portion of the bead wire wound around the former a predetermined amount;
wherein the guide device comprises:
a movable body supported movably in a tangential direction of the former and being capable of clamping and unclamping the bead wire,
a guide body supported on the movable body to be moved together with the movable body in the tangential direction and having a guide portion for guiding the head wire in the tangential direction of the former, the guide body being allowed to be swung by the bead wire guided at the guide portion in a plane extending in parallel to the tangential direction of the former, and
a restriction member engagable with the guide body for allowing the guide body to be swung in the plane when the movable body is at a retracted position, in the tangential direction during the winding of the bead wire around the former, and for restricting the guide body to not be swung in the plane and to set the guide body to a predetermined position in the plane when the movable body is at an advanced position in the tangential direction for setting a starting end of the bead wire on the former.

2. The bead wire winding and forming device as set forth in claim 1, wherein the restriction member is provided on a support frame which movably supports the movable body, and includes a restriction hole for inserting the guide body therein, and the guide body is formed at a forward end portion thereof with a taper portion that remains loosely inserted in the restriction hole when the movable body is at the retracted position and at a rearward end portion thereof with a constant width portion engaged with the restriction hole when the movable body is at the advance position.

3. The bead wire winding and forming device as set forth in claim 1, wherein the former includes a recessed channel for winding the bead wire around an outer circumference thereof and that the recessed channel is formed thereon with grooves of plural rows for guiding the bead wire.

4. The bead wire winding and forming device as set forth in claim 2, wherein the former includes a recessed channel for winding the bead wire around an outer circumference thereof and that the recessed channel is formed thereon with grooves of plural rows for guiding the bead wire.

5. The bead wire winding and forming device as set forth in claim 1, wherein the guide portion of the guide body is configured to restrict the bead wire from moving in a swing direction of the guide body but to allow the bead wire to move in a direction perpendicular to the swing direction of the guide body.

6. The bead wire winding and forming device as set forth in claim 2, wherein the guide portion of the guide body is configured to restrict the bead wire from moving in a swing direction of the guide body but to allow the bead wire to move in a direction perpendicular to the swing direction of the guide body.

7. The bead wire winding and forming device as set forth in claim 3, wherein the guide portion of the guide body is configured to restrict the bead wire from moving in a swing direction of the guide body but to allow the bead wire to move in a direction perpendicular to the swing direction of the guide body.

8. The bead wire winding and forming device as set forth in claim 2, wherein:
    the guide body comprises a flat plate member extending in the moving direction of the movable body and supported at a base end portion thereof, opposite to the guide portion at a forward end thereof, to be swingable about a pivot in a plane parallel with the rotational axis of the former, and
    the flat plate member is tapered to be narrow at the forward end thereof where the guide portion is provided so that the guide portion is swingable in the plane within the restriction hole during the winding of the bead wire around the former.

9. The bead wire winding and forming device as set forth in claim 1, further comprising:
    tendency application rollers for applying to the bead wire a tendency toward an arc which approximately conforms in curvature with the outer diameter of the former, to accurately wind the bead wire around the outer circumference of the former.

* * * * *